US012692354B2

(12) United States Patent
Oota et al.

(10) Patent No.: US 12,692,354 B2
(45) Date of Patent: Jul. 28, 2026

(54) CARBON FIBER REINFORCED COMPOSITE AND PRODUCTION METHOD OF CARBON FIBER REINFORCED COMPOSITE

(71) Applicant: Sekisui Chemical Co., Ltd., Osaka (JP)

(72) Inventors: Ayako Oota, Shiga (JP); Haruka Yoshida, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 164 days.

(21) Appl. No.: 18/693,333

(22) PCT Filed: Sep. 22, 2022

(86) PCT No.: PCT/JP2022/035490

§ 371 (c)(1),
(2) Date: Mar. 19, 2024

(87) PCT Pub. No.: WO2023/048260

PCT Pub. Date: Mar. 30, 2023

(65) Prior Publication Data

US 2024/0392085 A1 Nov. 28, 2024

(30) Foreign Application Priority Data

Sep. 24, 2021 (JP) ................................ 2021-155983
Mar. 24, 2022 (JP) ................................ 2022-048657

(51) Int. Cl.

| | |
|---|---|
| ***C08J 5/24*** | (2006.01) |
| ***B29C 70/42*** | (2006.01) |
| ***B29K 29/00*** | (2006.01) |
| ***B29K 63/00*** | (2006.01) |
| ***B29K 105/00*** | (2006.01) |
| ***B29K 105/08*** | (2006.01) |
| ***B29K 307/04*** | (2006.01) |
| ***C08L 63/00*** | (2006.01) |

(52) U.S. Cl.

CPC ............... *C08J 5/243* (2021.05); *C08L 63/00* (2013.01); *B29C 70/42* (2013.01); *B29K 2029/14* (2013.01); *B29K 2063/00* (2013.01); *B29K 2105/0005* (2013.01); *B29K 2105/0094* (2013.01); *B29K 2105/0872* (2013.01); *B29K 2307/04* (2013.01); *C08J 2363/02* (2013.01); *C08J 2429/14* (2013.01)

(58) Field of Classification Search

CPC ..... C08J 5/243; C08J 5/04; C08J 5/042; C08J 5/24; C08J 2363/02; C08J 2400/00; C08J 2429/14; C08L 63/00; C08L 29/14; C08L 101/00; B29C 70/42; B29K 2029/14; B29K 2063/00; B29K 2105/0005; B29K 2105/0094; B29K 2105/0872; B29K 2307/04; C08G 59/00; C08K 7/06

USPC .......................................................... 442/173

See application file for complete search history.

(56) References Cited

U.S. PATENT DOCUMENTS

| | | | | |
|---|---|---|---|---|
| 2021/0002528 | A1* | 1/2021 | Yamada | C09J 11/04 |
| 2021/0040304 | A1 | 2/2021 | Tateno et al. | |

FOREIGN PATENT DOCUMENTS

| | | |
|---|---|---|
| CN | 111615530 | 9/2020 |
| JP | 6-9802 | 1/1994 |
| JP | 2006335791 | * 12/2006 |
| JP | 2009-292976 | 12/2009 |
| JP | 2015-160938 | 9/2015 |
| JP | 2018-150635 | 9/2018 |
| JP | 2019-89951 | 6/2019 |
| JP | 2020-132733 | 8/2020 |
| TW | 201736449 | 10/2017 |
| WO | 2017/104771 | 6/2017 |
| WO | 2019/189226 | 10/2019 |
| WO | 2019/202762 | 10/2019 |

OTHER PUBLICATIONS

International Search Report issued Dec. 6, 2022 in International (PCT) Application No. PCT/JP2022/035490.

* cited by examiner

*Primary Examiner* — Camie S Thompson
(74) *Attorney, Agent, or Firm* — Wenderoth, Lind & Ponack, L.L.P.

(57) ABSTRACT

The present invention provides a carbon-fiber-reinforced composite that can reduce the curing time and achieve high mechanical strength while reducing resin bleeding, and a method for producing a carbon-fiber-reinforced composite. Provided is a carbon-fiber-reinforced composite containing: carbon fibers, an epoxy resin, a curing agent, and a thermoplastic resin, wherein a mixture of the epoxy resin and the thermoplastic resin has a ratio of viscosity at 30° C. to viscosity at 90° C. (viscosity at 30° C./viscosity at 90° C.) of less than 100.

8 Claims, No Drawings

CARBON FIBER REINFORCED COMPOSITE AND PRODUCTION METHOD OF CARBON FIBER REINFORCED COMPOSITE

TECHNICAL FIELD

The present invention relates to carbon-fiber-reinforced composites and methods for producing carbon-fiber-reinforced composites.

BACKGROUND ART

Fiber-reinforced plastics, a type of fiber-reinforced composite, have light weight, high strength, and high rigidity, and thus have found a wide range of applications from structural material applications such as aircraft, automobiles, and ships to general sports applications such as tennis rackets, fishing rods, and golf shafts. One method to produce fiber-reinforced plastics is to use a prepreg, an intermediate material formed by impregnating a reinforcing material made of long fibers (continuous fibers), such as reinforcing fibers, with a matrix resin. This method advantageously enables easy control of the reinforcing-fiber content in the fiber-reinforced plastics, while enabling designing the content to be higher.

Epoxy resins are suitable as matrix resins for such fiber-reinforced composites because of their excellent moldability. The use of epoxy resins enables the production of fiber-reinforced composites having excellent mechanical properties and excellent heat resistance even after curing. Epoxy resins are thus used in a wide range of industries.

For example, Patent Literature 1 discloses a prepreg containing reinforcing fibers, an epoxy resin, a carboxy group-containing polyvinyl formal resin, and an amine curing agent, each in a predetermined amount.

Patent Literature 2 discloses a prepreg for fiber-reinforced composites. The prepreg contains an epoxy resin, a thermoplastic resin soluble in the epoxy resin, and a latent curing agent, each in a predetermined amount.

Patent Literature 3 discloses a prepreg obtained by impregnating reinforcing fibers with an epoxy resin composition containing an epoxy compound, a curing agent, and a polyvinyl acetal resin.

CITATION LIST

Patent Literature

Patent Literature 1: WO 2019/202762
Patent Literature 2: JP H06-9802 A
Patent Literature 3: JP H05-186667 A

SUMMARY OF INVENTION

Technical Problem

However, even with the techniques disclosed in Patent Literatures 1 to 3, resin may bleed out from the resulting prepreg, which may increase variation between products.

Moreover, the resulting prepreg may require a long curing time when it is further cured.

Moreover, the resulting prepreg may have insufficient toughness, which may decrease the mechanical strength.

In view of the situation in the art, the present invention aims to provide a carbon-fiber-reinforced composite that can reduce the curing time and achieve high mechanical strength while reducing resin bleeding, and a method for producing a carbon-fiber-reinforced composite.

Solution to Problem

The present disclosure (1) relates to a carbon-fiber-reinforced composite containing: carbon fibers; an epoxy resin; a curing agent; and a thermoplastic resin, wherein a mixture of the epoxy resin and the thermoplastic resin has a ratio of viscosity at 30° C. to viscosity at 90° C. (viscosity at 30° C./viscosity at 90° C.) of less than 100.

The present disclosure (2) relates to the carbon-fiber-reinforced composite according to the present disclosure (1), wherein the thermoplastic resin has a glass transition temperature of 60° C. or higher.

The present disclosure (3) relates to the carbon-fiber-reinforced composite according to the present disclosure (1) or (2), wherein the thermoplastic resin is a polyvinyl acetal resin.

The present disclosure (4) relates to the carbon-fiber-reinforced composite according to the present disclosure (3), wherein the polyvinyl acetal resin has structural units represented by the following formula (1). In the formula (1), each $R^1$ represents an alkyl group having a carbon number of 1 or greater, and $R^1$s may be the same as or different from each other.

The present disclosure (5) relates to the carbon-fiber-reinforced composite according to any one of the present disclosures (1) to (4), wherein the polyvinyl acetal resin has a hydroxy group content of 16.0 mol % or more and 45.0 mol % or less.

The present disclosure (6) relates to the carbon-fiber-reinforced composite according to any one of the present disclosures (1) to (5), which is used as a prepreg.

The present disclosure (7) relates to the carbon-fiber-reinforced composite according to any one of the present disclosures (1) to (6), wherein the epoxy resin contains a bisphenol A epoxy resin.

The present disclosure (8) relates to the carbon-fiber-reinforced composite according to any one of the present disclosures (1) to (7), which contains 0.01 parts by weight or more and 40 parts by weight or less of the thermoplastic resin relative to 100 parts by weight of the epoxy resin.

The present disclosure (9) relates to the carbon-fiber-reinforced composite according to any one of the present disclosures (1) to (8), which contains 0.5 parts by weight or more and 300 parts by weight or less of the epoxy resin relative to 100 parts of the carbon fibers.

The present disclosure (10) relates to a method for producing a carbon-fiber-reinforced composite, including at least the steps of: forming a resin composition containing an epoxy resin, a curing agent, and a thermoplastic resin; and forming a composite of the resin composition with carbon fibers, wherein a mixture of the epoxy resin and the thermoplastic resin has a ratio of viscosity at 30° C. to viscosity at 90° C. (viscosity at 30° C./viscosity at 90° C.) of less than 100.

The present invention is described in detail below.

As a result of extensive studies, the present inventors have found out that a carbon-fiber-reinforced composite which contains carbon fibers, an epoxy resin, a curing agent, and a thermoplastic resin and in which a mixture of the epoxy resin and the thermoplastic resin has specific viscosity properties can reduce the curing time and achieve high mechanical strength while reducing resin bleeding. The inventors thus completed the present invention.

In the present invention, the carbon-fiber-reinforced composite contains carbon fibers, an epoxy resin, a curing agent, and a thermoplastic resin, and a mixture of the epoxy resin and the thermoplastic resin (hereinafter also simply referred to as a "mixture") has a ratio of viscosity at 30° C. to viscosity at 90° C. (viscosity at 30° C./viscosity at 90° C.) of less than 100. The mixture contains the epoxy resin and the thermoplastic resin at a mixing weight ratio of 9:1.

With the viscosity ratio of the mixture being less than 100, the carbon-fiber-reinforced composite can reduce the curing time and achieve high mechanical strength while reducing resin bleeding.

The lower limit of the viscosity ratio of the mixture is preferably 1, more preferably 3.

The upper limit of the viscosity ratio is preferably 95, more preferably 50.

The viscosity can be obtained by heating the same epoxy resin and thermoplastic resin as those in the carbon-fiber-reinforced composite at 150° C. for dissolution at the same mixing ratio as that in the carbon-fiber-reinforced composite of the present invention, and subjecting the resulting sample (mixture) to measurement using a rheometer. For example, the viscosity means a viscosity at 30° C. or 90° C. measured using 20-mm parallel plates at a temperature decrease rate of 5° C./min, a rotation rate of 100 rpm, and a gap of 500 μm.

The epoxy resin and thermoplastic resin used in the viscosity measurement means the epoxy resin and the thermoplastic resin contained in the carbon-fiber-reinforced composite.

Regarding the mixing ratio of the epoxy resin and the thermoplastic resin in the viscosity measurement, the viscosity can be measured at an epoxy resin: thermoplastic resin ratio within the range from 100:43 to 100:0.1. The range is more preferably from 100:30 to 100:0.1.

In the present invention, the viscosity ratio of the mixture can be adjusted, for example, by adjusting the type, average degree of polymerization, and glass transition temperature of the thermoplastic resin and the type of the epoxy resin. When a polyvinyl acetal resin is used as the thermoplastic resin, the viscosity ratio also can be adjusted by adjusting the degree of acetalization, the hydroxy group content, and the acetyl group content, for example.

When a polyvinyl acetal resin is used as the thermoplastic resin, decreasing the carbon number of the acetal group (carbon number of the raw material aldehyde) can increase the viscosity at 30° C., thus increasing the viscosity ratio.

The lower limit of the viscosity of the mixture at 30° C. is preferably 10 Pas, and the upper limit thereof is preferably 1,500 Pa·s. When the viscosity ratio of the mixture is within the range, the carbon-fiber-reinforced composite can reduce the curing time and achieve high mechanical strength while reducing resin bleeding. The lower limit of the viscosity at 30° C. is more preferably 30 Pas, and the upper limit thereof is more preferably 1,000 Pa·s.

The lower limit of the viscosity of the mixture at 90° C. is preferably 0.01 Pas, and the upper limit thereof is preferably 10 Pas. When the viscosity ratio of the mixture is within the range, the carbon-fiber-reinforced composite can reduce the curing time and achieve high mechanical strength while reducing resin bleeding. The lower limit of the viscosity at 90° C. is more preferably 0.1 Pas, and the upper limit thereof is more preferably 5 Pa·s.

The carbon-fiber-reinforced composite of the present invention contains a thermoplastic resin.

Examples of the thermoplastic resin include polyolefins, polyesters, (meth)acrylic resins, polyamides, polyurethanes, ABS resins, AES resins, AAS resins, MBS resins, anion/styrene copolymers, styrene/methyl (meth)acrylate copolymers, polystyrene, polycarbonates, polyphenylene oxide, phenoxy resins, polyphenylene sulfide, polyimides, polyetheretherketone, polyethersulfone, polysulfones, polyarylates, polyetherketones, polyether nitrile, polythioether sulfone, polybenzimidazoles, polycarbodiimides, polyvinyl alcohol resins, and polyvinyl acetal resins.

In particular, the thermoplastic resin is preferably a resin having a glass transition temperature (Tg, described later) of 60° C. or higher.

Examples of the polyolefins include polyethylene, polypropylene, ethylene/vinyl acetate copolymers, ethylene/(meth)acrylic acid copolymers, ethylene/methyl (meth)acrylate copolymers, ethylene/ethyl (meth)acrylate copolymers, ethylene/vinyl alcohol copolymers, and ethylene/ethyl (meth)acrylate/maleic anhydride copolymers.

Examples of the (meth)acrylic resins include polymethyl (meth)acrylate.

Among the thermoplastic resins, polyvinyl acetal resins are preferred.

The thermoplastic resins may be used alone or in combination of two or more thereof.

The polyvinyl acetal resin preferably includes structural units represented by the following formula (1).

[Chem. 1]

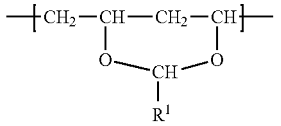

(1)

In the formula (1), each $R^1$ represents an alkyl group having a carbon number of 1 or greater. $R^1$s may be the same as or different from each other.

In the formula (1), each $R^1$ is preferably an alkyl group having a carbon number of 1 or greater.

When the alkyl group has a carbon number of 1 or greater, the carbon fiber composite can advantageously have improved toughness and excellent shock resistance. The carbon number is preferably 1 or greater and 6 or less. In particular, $R^1$s in the formula (1) preferably include an alkyl group having a carbon number of 1 or greater and/or an alkyl group having a carbon number of 3 or greater.

$R^1$s may be the same or a combination of different groups.

When $R^1$s are a combination of different groups, preferred is a combination of an alkyl group having a carbon number of 1 or greater and an alkyl group having a carbon number of 3 or greater.

The alkyl group may be any alkyl group having a carbon number of 1 or greater. Examples include methyl, ethyl, n-propyl, isopropyl, n-butyl, iso-butyl, sec-butyl, and tert-butyl groups. Examples also include pentyl, hexyl, heptyl, 2-ethylhexyl, octyl, nonyl, decyl, undecyl, dodecyl, tridecyl, tetradecyl, pentadecyl, and octadecyl groups. Preferred among these are methyl and n-propyl groups.

In the polyvinyl acetal resin, the lower limit of the amount of the acetal-group containing structural unit represented by the formula (1) is preferably 30 mol %, and the upper limit thereof is preferably 85 mol %.

When the acetal group content is 30 mol % or more, the polyvinyl acetal resin can have excellent toughness. When the acetal group content is 85 mol % or less, the compatibility with epoxy resins can be improved.

The lower limit of the acetal group content is more preferably 60 mol %, and the upper limit thereof is more preferably 80 mol %.

The acetal group content herein is calculated by a method in which the constitutional units with two hydroxyl groups having been acetalized are counted, because the acetal group in the polyvinyl acetal resin is obtained by acetalizing two constitutional units having a hydroxy group in the polyvinyl alcohol resin.

In the polyvinyl acetal resin, when $R^1$s in the formula (1) include a methyl group, the lower limit of the amount of the structural unit wherein $R^1$ is a methyl group (hereinafter the amount is also referred to as a "degree of acetoacetalization") is preferably 5 mol %, and the upper limit thereof is preferably 85 mol %. When the amount is within the range, the compatibility with epoxy resins can be maintained, and excellent viscosity properties can be obtained.

In the polyvinyl acetal resin, when $R^1$s in the formula (1) include a n-propyl group, the lower limit of the amount of the structural unit wherein $R^1$ is a n-propyl group (hereinafter the amount is also referred to as a "degree of butyralization") is preferably 0.1 mol %, and the upper limit thereof is preferably 80 mol %. When the amount is within the range, the compatibility with epoxy resins can be maintained, and excellent viscosity properties can be obtained.

In the polyvinyl acetal resin, when $R^1$s in the formula (1) include both a methyl group and a n-propyl group, the ratio of the degree of acetoacetalization to the degree of butyralization [degree of acetoacetalization/degree of butyralization] is preferably 0.06 or greater and 850 or less. The ratio is more preferably 0.1 or greater and 375 or less.

[Chem. 2]

(2)

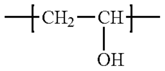

(3)

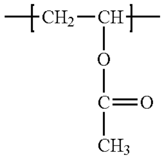

In the polyvinyl acetal resin, the lower limit of the amount of a hydroxy group-containing structural unit represented by the formula (2) (hereinafter the amount is also referred to as a "hydroxy group content") is preferably 15.0 mol %, and the upper limit thereof is preferably 45.0 mol %.

When the hydroxy group content is 15.0 mol % or more, the polyvinyl acetal resin can have excellent adhesiveness. When the hydroxy group content is 45.0 mol % or less, the compatibility with epoxy resins can be sufficiently improved.

The lower limit of the hydroxy group content is more preferably 16.0 mol %, still more preferably 18.0 mol %, further preferably 20.0 mol %, and the upper limit thereof is more preferably 40.0 mol %, still more preferably 38.0 mol %.

In the polyvinyl acetal resin, the lower limit of the amount of an acetyl group-containing structural unit represented by the formula (3) (hereinafter the amount is also referred to as an "acetyl group content") is preferably 0.1 mol %, and the upper limit thereof is preferably 25 mol %.

When the acetyl group content is 0.1 mol % or more, a viscosity increase due to intramolecular or intermolecular hydrogen bonds in the polyvinyl acetal resin can be suppressed. When the acetyl group content is 25 mol % or less, the handleability can be improved without an excessive decrease in the heat resistance of the polyvinyl acetal resin.

The lower limit of the acetyl group content is more preferably 0.5 mol %, and the upper limit thereof is more preferably 15 mol %. The lower limit is still more preferably 0.8 mol %, and the upper limit is still more preferably 14 mol %.

The polyvinyl acetal resin preferably has a sum of the acetal group content, the hydroxy group content, and the acetyl group content of more than 95 mol %. The sum is more preferably 96 mol % or more.

The polyvinyl acetal resin preferably has an average degree of polymerization of 2,500 or less.

When the average degree of polymerization is 2,500 or less, the polyvinyl acetal resin can impart sufficient mechanical strength. When the average degree of polymerization is 1,000 or less, the polyvinyl acetal resin can have sufficiently improved solubility in an organic solvent and thus have better application properties and better dispersibility.

The lower limit of the average degree of polymerization is more preferably 150, and the upper limit thereof is more preferably 1,000.

The average degree of polymerization is the same as the degree of polymerization of a raw material polyvinyl alcohol resin. The average degree of polymerization of the raw material polyvinyl alcohol resin can be measured in conformity with JIS K6726-1994.

The thermoplastic resin preferably has a glass transition temperature (Tg) of 60° C. or higher.

When the glass transition temperature is 60° C. or higher, the heat resistance can be improved while the amount of bleeding during impregnation can be reduced. The lower limit of the glass transition temperature is more preferably 63° C. The upper limit of the glass transition temperature is not limited but it is preferably 120° C.

The glass transition temperature can be measured using a differential scanning calorimeter (DSC).

The polyvinyl acetal resin can be typically produced by acetalizing a polyvinyl alcohol resin.

The method for the acetalization is not limited and may be a conventionally known method. Examples of the method include one in which an aldehyde is added to a solution of a polyvinyl alcohol resin in water, an alcohol, a water/alcohol mixture, or dimethylsulfoxide (DMSO) in the presence of an acid catalyst.

The aldehyde may be a linear, branched, cyclic saturated, cyclic unsaturated, or aromatic aldehyde having a carbon number of 1 to 19. Specific examples include formaldehyde, acetaldehyde, propionylaldehyde, n-butyraldehyde, isobutyraldehyde, tert-butyraldehyde, benzaldehyde, and cyclohexylaldehyde. Each of the aldehydes may be used alone or in combination of two or more. The aldehyde is preferably an aldehyde other than formaldehyde and cyclic saturated, cyclic unsaturated, or aromatic aldehydes. Acetaldehyde and n-butyraldehyde are particularly preferred.

The amount of the aldehyde to be added can be appropriately determined according to the acetal group content of the aimed polyvinyl acetal resin. In particular, the amount is preferably 50 mol % or more and 95 mol % or less, more preferably 55 mol % or more and 90 mol % or less relative to 100 mol % of the polyvinyl alcohol resin. The amount in the range is preferred because the acetalization reaction can be efficiently carried out and unreacted aldehyde can be easily removed.

The polyvinyl alcohol resin may be, for example, a conventionally known polyvinyl alcohol resin such as a resin produced by saponifying polyvinyl acetate with an alkali, an acid, aqueous ammonia, or the like.

The polyvinyl alcohol resin may be completely saponified, but is not necessarily completely saponified and may be a partially saponified polyvinyl alcohol resin as long as the polyvinyl alcohol resin has at least one unit having a hydroxy group diad for a meso or a racemo position in at least one position of the main chain. Examples of other polyvinyl alcohol resins that can be used include copolymers of vinyl alcohol and a monomer copolymerizable with vinyl alcohol, such as ethylene-vinyl alcohol copolymer resins and partially saponified ethylene-vinyl alcohol copolymer resins.

Examples of the polyvinyl acetate resin include ethylene-vinyl acetate copolymers.

The polyvinyl acetal resin is preferably an acetalized product of a polyvinyl alcohol resin having a degree of saponification of 75 mol % or greater. The degree of saponification is more preferably 85 mol % or more and 99.5 mol % or less.

The holding time after reaction is preferably 1.5 hours or longer, more preferably 2 hours or longer, although it depends on other conditions. The above holding time allows the acetalization reaction to proceed sufficiently.

The holding temperature after reaction is preferably 15° C. or higher, more preferably 20° C. or higher. The above holding temperature allows the acetalization reaction to proceed sufficiently.

The polyvinyl alcohol resin usually contains a carboxylic acid salt that is a basic component generated during saponification. The carboxylic acid salt is preferably removed by washing or neutralized before use. Removal by washing or neutralization of the carboxylic acid salt can effectively reduce the condensation reaction of the aldehyde catalyzed under basic conditions, thus further reducing resin discoloration.

The washing in the washing step may be performed by a method including extracting the basic component with a solvent, a method including dissolving the resin in a good solvent and then adding a poor solvent to reprecipitate the resin alone, or a method including adding an adsorbent to a solution containing the polyvinyl alcohol resin to remove the basic component by adsorption.

Examples of a neutralizer used in the neutralizing step include mineral acids such as hydrochloric acid, sulfuric acid, nitric acid, and phosphoric acid, inorganic acids such as carbonic acid, carboxylic acids such as formic acid, acetic acid, propionic acid, butyric acid, and hexanoic acid, aliphatic sulfonic acids such as methanesulfonic acid and ethanesulfonic acid, aromatic sulfonic acids such as benzenesulfonic acid, and phenols such as phenol.

The amount of the thermoplastic resin in the carbon-fiber-reinforced composite of the present invention is preferably 0.01 parts by weight or more and 40 parts by weight or less relative to 100 parts by weight of the epoxy resin. When the amount of the thermoplastic resin is within the range, the mechanical strength of the resulting carbon-fiber-reinforced composite can be sufficiently enhanced.

The amount of the thermoplastic resin in the carbon-fiber-reinforced composite of the present invention is preferably 0.001% by weight or more and preferably 35% by weight or less relative to the entire composite. When the amount of the thermoplastic resin is within the range, the mechanical strength of the resulting carbon-fiber-reinforced composite can be sufficiently enhanced.

The carbon-fiber-reinforced composite of the present invention contains carbon fibers.

Example of the carbon fibers include PAN carbon fibers, pitch carbon fibers, cellulose carbon fibers, and vapor-grown carbon fibers.

Usable carbon fibers include those in the form of twisted, untwisted, or never-twisted yarn. In twisted yarn, the alignment of the filaments constituting the carbon fibers is not parallel, which may decrease the mechanical properties of the resulting carbon-fiber-reinforced composite. Thus, untwisted yarn or never-twisted yarn, which provides a good balance between the moldability and strength properties of the carbon-fiber-reinforced composite, is preferably used.

To improve the adhesiveness to the matrix resin, the carbon fibers may be subjected to oxidation treatment for introduction of oxygen-containing functional groups. Examples of the oxidation treatment include gas phase oxidation, liquid phase oxidation, and liquid phase electrolytic oxidation. Preferred is liquid phase electrolytic oxidation because it provides high productivity and allows treatment with less variation.

The carbon fibers preferably have a single-fiber fineness of 0.2 to 2.0 dtex, more preferably 0.4 to 1.8 dtex. When the single-fiber fineness is 0.2 dtex or greater, the carbon fibers are less susceptible to damage due to contact with guide rollers during twisting, as well as to similar damage during the resin composition impregnating step. When the single-fiber fineness is 2.0 dtex or less, the carbon fibers can be sufficiently impregnated with the resin composition, resulting in improved fatigue resistance. For the same reasons as above, the carbon fibers preferably have a fineness of 50 to 1,800 tex.

The number of filaments per fiber bundle of the carbon fibers is preferably 2,500 to 100,000. With fewer than 2, 500 filaments, meandering of the fiber arrangement tends to occur, which tends to decrease the strength. With more than 100,000 filaments, impregnation with the resin may be difficult during production or molding of the prepreg. The number of filaments is more preferably 2,800 to 80,000.

The carbon fibers preferably have an average fiber diameter of 2 μm or greater, more preferably 3 μm or greater, while preferably 30 μm or less, more preferably 26 μm or less.

The carbon fibers preferably have an average fiber length of 2 mm or greater, more preferably 4 mm or greater, while preferably 100 mm or less, more preferably 80 mm or lower.

The carbon fibers may be in any form. Examples include a fiber form and a woven fabric sheet form, a knitted fabric sheet form, and a non-woven fabric sheet form.

When the carbon fibers are in a sheet form, the fibers preferably have a weight per unit area of 100 $g/m^2$ or greater, more preferably 350 $g/m^2$ or greater, while preferably 1,000 $g/m^2$ or less, more preferably 650 $g/m^2$ or less.

The carbon fibers preferably have a density of 1.0 $g/cm^3$ or greater and 3.0 $g/cm^3$ or less.

The amount of the carbon fibers in the carbon-fiber-reinforced composite of the present invention is preferably 35% by weight or more and 100% by weight or less. When the amount of the carbon fibers is within the range, the mechanical strength of the resulting carbon-fiber-reinforced composite can be sufficiently enhanced.

The amount of the carbon fibers is preferably 50 to 3,800 parts by weight relative to 100 parts by weight of the epoxy resin.

The carbon-fiber-reinforced composite of the present invention contains an epoxy resin.

With the epoxy resin contained, crosslinking can be performed by energy application such as heating, leading to high adhesiveness.

Examples of the epoxy resin include monofunctional epoxy compounds and polyfunctional epoxy compounds such as bifunctional epoxy compounds and tri- or higher functional epoxy compounds. The epoxy resin preferably contains a monofunctional epoxy compound and a bifunctional epoxy compound.

Examples of the monofunctional epoxy compounds include glycidyl group-containing (meth)acrylates, aliphatic epoxy resins, and aromatic epoxy resins. In particular, the epoxy resin preferably contains a glycidyl group-containing (meth)acrylate.

Examples of the glycidyl group-containing (meth)acrylate include glycidyl (meth)acrylate, 2-hydroxyethyl (meth)acrylate glycidyl ether, 2-hydroxypropyl (meth)acrylate glycidyl ether, 3-hydroxypropyl (meth)acrylate glycidyl ether, 4-hydroxybutyl (meth)acrylate glycidyl ether, and polyethylene glycol-polypropylene glycol (meth)acrylate glycidyl ether.

Examples of the aliphatic epoxy resins include glycidyl ethers of aliphatic alcohols such as butyl glycidyl ether and lauryl glycidyl ether.

Examples of the aromatic epoxy resins include phenyl glycidyl ether and 4-t-butylphenyl glycidyl ether.

Preferred among these are glycidyl group-containing (meth)acrylates and aromatic epoxy resins.

Examples of the bifunctional epoxy compounds include: bifunctional aromatic epoxy resins such as phenol novolac epoxy resins, bisphenol A epoxy resins, bisphenol F epoxy resins, bisphenol S epoxy resins, alkylphenol epoxy resins, resorcin epoxy resins, and bifunctional naphthalene epoxy resins; bifunctional alicyclic epoxy resins such as dicyclopentadiene dimethanol diglycidyl ether; polyalkylene glycol diglycidyl ethers such as polypropylene glycol diglycidyl ether and polyethylene glycol diglycidyl ether; bifunctional glycidyl ester epoxy resins such as diglycidyl phthalate, diglycidyl tetrahydrophthalate, and dimer acid diglycidyl esters; bifunctional glycidyl amine epoxy resins such as diglycidyl aniline and diglycidyl toluidine; bifunctional heterocyclic epoxy resins; bifunctional diarylsulfone epoxy resins; hydroquinone epoxy resins such as hydroquinone diglycidyl ether, 2,5-di-tert-butylhydroquinone diglycidyl ether, and resorcin diglycidyl ether; bifunctional alkylene glycidyl ether compounds such as butanediol diglycidyl ether, butenediol diglycidyl ether, and butynediol diglycidyl ether; bifunctional glycidyl group-containing hydantoin compounds such as 1,3-diglycidyl-5,5-dialkylhydantoin and 1-glycidyl-3-(glycidoxyalkyl)-5,5-dialkylhydantoin; bifunctional glycidyl group-containing siloxanes such as 1,3-bis(3-glycidoxypropyl)-1,1,3,3-tetramethyldisiloxane and α,β-bis(3-glycidoxypropyl) polydimethylsiloxane; neopentyl glycol diglycidyl ether; and their modified products. The bifunctional epoxy compounds may be used alone or in combination of two or more thereof. From the standpoint of reactivity and workability, preferred among these are bifunctional aromatic epoxy resins such as bisphenol A epoxy resins and bisphenol F epoxy resin resins, bifunctional alicyclic epoxy resins such as dicyclopentadiene dimethanol diglycidyl ether, and polyalkylene glycol diglycidyl ethers such as polypropylene glycol diglycidyl ether.

Examples of the tri- or higher functional epoxy compounds include: tri- or higher functional aromatic epoxy resins such as tri- or higher functional phenol novolac epoxy resins; tri- or higher functional alicyclic epoxy resins; tri- or higher functional glycidyl ester epoxy resins; tri- or higher functional glycidyl amine epoxy resins such as tetraglycidyl diaminodiphenylmethane, triglycidyl-p-aminophenylmethane, triglycidyl-m-aminophenylmethane, and tetraglycidyl-m-xylylenediamine; tri- or higher functional heterocyclic epoxy resins; tri- or higher functional diaryl sulfone epoxy resins; tri- or higher functional alkylene glycidyl ether compounds such as glycerol triglycidyl ether, trimethylolpropane triglycidyl ether, and pentaerythritol tetraglycidyl ether; tri- or higher functional glycidyl group-containing hydantoin compounds; tri- or higher functional glycidyl group-containing siloxanes; and their modified products. These tri- or higher functional epoxy resins may be used alone or in combination of two or more thereof.

The lower limit of the amount of the epoxy resin in the carbon-fiber-reinforced composite of the present invention is preferably 3% by weight, more preferably 6.5% by weight, and the upper limit thereof is preferably 66% by weight, more preferably 56% by weight.

In the present invention, the carbon-fiber-reinforced composite preferably contains 0.5 parts by weight or more and 300 parts by weight or less of the epoxy resin relative to 100 parts by weight the carbon fibers. This can improve the curing rate while imparting high toughness.

The lower limit of the epoxy equivalent amount (molecular weight per epoxy group) of the epoxy resin is preferably 100, and the upper limit thereof is preferably 5,000.

The lower limit of the molecular weight of the epoxy resin is preferably 100, and the upper limit thereof is preferably 70,000.

In the carbon-fiber-reinforced composite of the present invention, the lower limit of the ratio of the amount of the thermoplastic resin to the amount of the epoxy resin (amount of thermoplastic resin/amount of epoxy resin) is preferably 0.0001, more preferably 0.001, and the upper limit thereof is preferably 0.4, more preferably 0.35.

The carbon-fiber-reinforced composite of the present invention contains a curing agent.

Examples of the curing agent include phenol curing agents, thiol curing agents, amine curing agents, imidazole curing agents, acid anhydride curing agents, cyanate curing agents, and active ester curing agents. Preferred among these are amine curing agents.

Examples of the amine curing agents include trimethylamine, triethylamine, N, N-dimethylpiperazine, triethylenediamine, benzyl dimethylamine, 2-(dimethylaminomethyl) phenol, 2,4,6-tris(dimethylaminomethyl) phenol, 1,8-diazabicyclo(5.4.0)-undecene-7, and 1,5-diazabicyclo(4.3.0)-nonene-5.

Examples of the imidazole curing agents include imidazole, 2-methylimidazole, 1,2-dimethylimidazole, 2-ethyl-4-methylimidazole, 2-undecylimidazole, 2-heptadecylimidazole, 2-phenylimidazole, 2-phenyl-4-methylimidazole, 1-benzylimidazole, 1-benzyl-2-phenylimidazole, and 1-cyanoethyl-2-methylimidazole.

The lower limit of the amount of the curing agent in the carbon-fiber-reinforced composite of the present invention is preferably 0.5 parts by weight, more preferably 1.0 parts by weight, and the upper limit thereof is preferably 100 parts by weight, more preferably 50 parts by weight, relative to 100 parts by weight of the epoxy resin.

The amount of the curing agent in the carbon-fiber-reinforced composite of the present invention is preferably 0.01 to 80% by weight.

The carbon-fiber-reinforced composite of the present invention may further contain a curing accelerator and/or an organic solvent.

Examples of the curing accelerator include phosphorous compounds, amine compounds, and organometallic compounds.

The lower limit of the amount of the curing accelerator in the carbon-fiber-reinforced composite of the present invention is preferably 0.1 parts by weight, more preferably 0.5 parts by weight, and the upper limit thereof is preferably 30 parts by weight, more preferably 10 parts by weight, relative to 100 parts by weight of the epoxy resin.

Examples of the organic solvent include ketones, alcohols, aromatic hydrocarbons, and esters.

Examples of the ketones include acetone, methyl ethyl ketone, dipropyl ketone, and diisobutyl ketone.

Examples of the alcohols include methanol, ethanol, isopropanol, and butanol.

Examples of the aromatic hydrocarbons include toluene and xylene.

Examples of the esters include methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, and 2-ethylhexyl butyrate.

Also usable are methyl cellosolve, ethyl cellosolve, butyl cellosolve, terpineol, dihydroterpineol, butyl cellosolve acetate, butyl carbitol acetate, terpineol acetate, and dihydroterpineol acetate.

The upper limit of the amount of the organic solvent in the carbon-fiber-reinforced composite of the present invention is preferably 5.0% by weight, particularly preferably 0% by weight.

The carbon-fiber-reinforced composite of the present invention may contain a different resin other than the epoxy resin and the thermoplastic resin, as long as the effects of the present invention are not impaired. In such a case, the amount of the different resin is preferably 10% by weight or less.

The carbon-fiber-reinforced composite of the present invention may further contain known additives such as tackifier resins, adhesion modifiers, emulsifiers, antioxidants, softeners, fillers, pigments, dyes, silane coupling agents, oxidation inhibitors, surfactants, and waxes, as long as the effects of the present invention are not impaired.

The method for producing the carbon-fiber-reinforced composite of the present invention is not limited. For example, it can be produced by a method for producing a carbon-fiber-reinforced composite, including at least the steps of: forming a resin composition containing an epoxy resin, a curing agent, and a thermoplastic resin; and forming a composite of the resin composition with carbon fibers, a mixture of the epoxy resin and the thermoplastic resin having a ratio of viscosity at 30° C. to viscosity at 90° C. (viscosity at 30° C./viscosity at 90° C.) of less than 100.

In the method for producing the carbon-fiber-reinforced composite of the present invention, the compositions of the epoxy resin, the curing agent, and the thermoplastic resin, as well as the "viscosity at 30° C./viscosity at 90° C." of the mixture are the same as in the carbon-fiber-reinforced composite of the present invention, and thus the description thereof is omitted.

The step of producing a resin composition is performed, for example, by mixing the epoxy resin, the curing agent, the thermoplastic resin, and optionally various additives with any of various mixers such as a ball mill, a blender mill, a triple roll mill, a disperser, or a planetary mixer, and then impregnating the carbon fibers with the resin composition.

In the step of producing a resin composition, the resin composition may be produced by adding the curing agent after mixing the epoxy resin and the thermoplastic resin, or by adding the epoxy resin, the curing agent, and the thermoplastic resin simultaneously.

Examples of the method for forming a composite of the resin composition with carbon fibers include a method of impregnating carbon fibers with the resin composition. Specific examples include an autoclave method, a press method, a hand lay-up method, a pultrusion method, a filament winding method, an RTM method, a pin winding method, an infusion method, a hot (cold) press method, a spray-up method, and a continuous press method.

The carbon-fiber-reinforced composite may be used in any application. The carbon-fiber-reinforced material can be used in structural materials for aircraft, as well as in automobile applications, ship applications, sports applications, and other general industry applications such as wind turbines or rolls. Among these, the carbon-fiber-reinforced composite is preferably applied to a prepreg or a sheet molding compound (SMC) as an intermediate member, particularly preferably to applications in which a prepreg is used.

Advantageous Effects of Invention

The present invention can provide a carbon-fiber-reinforced composite that can reduce the curing time and achieve high mechanical strength and high stability over time while reducing resin bleeding.

DESCRIPTION OF EMBODIMENTS

The present invention is more specifically described in the following with reference to, but not limited to, examples.

Example 1

(Production of Polyvinyl Acetal Resin)

An amount of 2,700 g of pure water was added to 250 g of a polyvinyl alcohol resin having an average degree of polymerization of 800 and a degree of saponification of 95.0 mol %, and stirred at 90° C. for about two hours for dissolution. This solution was cooled to 40° C., and to the solution were added 100 g of hydrochloric acid having a concentration of 35% by weight and 160 g of butyraldehyde to perform acetalization, whereby a reaction product was precipitated. Thereafter, the acetalization was completed at 40° C., followed by neutralization, washing with water, and drying by conventional methods. Thus, white powder of a polyvinyl acetal resin (polyvinyl butyral resin) was obtained.

The obtained polyvinyl acetal resin was dissolved in DMSO-$d_6$ at a concentration of 10% by weight, and $^{13}C$-NMR was performed to measure the acetal group content (degree of acetalization), the hydroxy group content, and the acetyl group content.

(Production of Prepreg)

To 100 parts by weight of a bisphenol A epoxy resin (JER828, available from Japan Epoxy Resins Co., Ltd.) were added 6 parts by weight of a curing agent (dicyandiamide) and 10 parts by weight of the obtained polyvinyl acetal resin, and they were mixed using Process Homogenizer (available from SMT) at 15,000 rpm to prepare a resin composition.

Subsequently, the obtained resin composition was impregnated into PAN carbon fibers (available from Toray Industries Inc., T700SC-12000-50C, number of filaments: 12,000, fineness: 800 tex, density: 1.8 g/cm$^3$) by a hand lay-up method and cured by heating at 150° C. for one hour, whereby a prepreg was produced. Here, 300 parts by weight of the PAN carbon fibers were used for 100 parts by weight of the bisphenol A epoxy resin.

Examples 2 to 10 and Comparative Examples 1 to 5, 8, and 9

A polyvinyl acetal resin, a resin composition, and a prepreg were produced as in Example 1 except that a polyvinyl alcohol resin (PVA) and an aldehyde of the types and in the amounts shown in Table 1 were used, and that the resin composition was prepared in accordance with the formulation shown in Table 2.

In Examples 6 and 7 and Comparative Example 3, two different aldehydes were used.

In Examples 7 to 9 and Comparative Examples 8 and 9, a bisphenol F epoxy resin (NPEF-170, available from Nan Ya Plastics Corporation) was used instead of the bisphenol A epoxy resin (JER828, available from Japan Epoxy Resins Co., Ltd.).

In Example 10, a non-aromatic [alicyclic] epoxy resin (Celloxide 2021P, available from Daicel Corporation) was used instead of the bisphenol A epoxy resin (JER828, available from Japan Epoxy Resins Co., Ltd.)

Comparative Example 6

A resin composition and a prepreg were produced as in Example 1 except that in "(Production of prepreg)", 5 parts by weight of polyethersulfone (SUMIKAEXCEL 5003MPS, available from Sumitomo Chemical Co., Ltd.) was added instead of 10 parts by weight of the obtained polyvinyl acetal resin.

Comparative Example 7

A resin composition and a prepreg were produced as in Example 1 except that in "(Production of prepreg)", 5 parts by weight of a phenoxy resin (Phenotohto YP-50, available from Nippon Steel Chemical & Material Co., Ltd.) was added instead of 10 parts by weight of the obtained polyvinyl acetal resin.

Examples 11 to 13 and Comparative Examples 10 and 11

A resin composition and a prepreg were produced as in Example 1 except that the resin composition was prepared in accordance with the formulation (epoxy resin, curing agent, polyvinyl acetal resin, and carbon fiber) shown in Table 2.

In Comparative Example 11, a phenol novolac epoxy resin (NPPN-631, available from Nan Ya Epoxy Resin, glycidyl ether epoxy resin with functionality greater than two) was used instead of the bisphenol A epoxy resin (JER828, available from Japan Epoxy Resins Co., Ltd.).

Regarding the type of polyvinyl acetal resin, "Example 1" means that the same polyvinyl acetal resin as in Example 1 was used.

(Evaluation)

The polyvinyl acetal resins (or other resins [polyethersulfone and phenoxy resin]), resin compositions, and prepregs obtained in the examples and the comparative examples were evaluated as follows. Tables 1 and 2 show the results.

(1) Measurement of Glass Transition Temperature (Tg)

The glass transition temperature of the obtained polyvinyl acetal resins (or other resins) was measured using a differential scanning calorimeter (DSC) at a temperature increase rate of 10° C./min.

(2) Rheology Evaluation (Viscosity Measurement)

The epoxy resin and the thermoplastic resin used in the production of each resin composition were mixed at the same mixing ratio as in the resin composition (for example, in Example 1, 10 parts by weight of the polyvinyl acetal resin relative to 100 parts by weight of the epoxy resin), and heated at 150° C. for dissolution, whereby a viscosity measurement sample (mixture) was produced. The viscosity of the obtained sample at 30° C. and 90° C. was measured using a rheometer (available from TA Instruments). The viscosity ratio (30° C./90° C.) was also calculated.

Plate: 20-mm parallel plates

Measurement temperature: 150° C. to 10° C. (temperature decrease rate: 5° C./min)

Rotation rate: 100 rpm

Gap: 500 μm (3) Stability Over Time

The viscosity of the viscosity measurement sample obtained in "(2) Rheology evaluation (viscosity measurement)" was measured in the same method as above immediately after the production of the sample.

Further, the viscosity was measured after the measurement sample was stored in a thermostatic chamber at 60° C. for three months, and the viscosity change percentage was calculated. The device and conditions for the viscosity measurement were the same as in "(2) Rheology evaluation (viscosity measurement)". The viscosity change percentage was calculated using the measured viscosity values at 60° C.

When the mixture of the thermoplastic resin and the epoxy resin has excellent stability over time, the carbon-fiber-reinforced composite produced using these resins can have excellent long-term storability.

(4) Curing Time Reduction Percentage

The curing end time of the obtained resin compositions was measured using a DSC.

Specifically, DSC measurement was performed under the conditions below. The line connecting the point at which the slope of the exothermic peak became 0 and the reaction start point was defined as the baseline. The curing reaction percentage at each time point was then calculated, where the area surrounded by the baseline and the DSC curve was taken as the heat of reaction. The time at which the curing reaction percentage reached 95% was determined as the curing end time.

[DSC Conditions]

Device: DSC (DSC 7000X) available from Hitachi High-Tech Science Corporation

Measurement temperature: 20→160° C. (10° C./min), holding for 150 minutes

Measurement atmosphere: air, 50 mL/min

The curing end time of control compositions, which were prepared by removing the thermoplastic resins from the resin compositions, was measured in the same manner. The curing time reduction percentage (%) was then calculated and evaluated in accordance with the following criteria.

○○ (Excellent): A curing time reduction percentage of 15% or higher.

○ Good): A curing time reduction percentage of 10% or higher and lower than 15%.

Δ (Fair): A curing time reduction percentage of 5% or higher and lower than 10%.

x (Poor): A curing time reduction percentage of lower than 5%.

(5) Resin Composition Retention Percentage

For the obtained prepregs, the amount of resin composition remaining in the carbon fibers relative to the amount of the resin composition impregnated into the carbon fibers (resin composition retention percentage) was calculated and evaluated in accordance with the following criteria. A higher resin composition retention percentage indicates less bleeding of resin and the like from the prepreg.

○○ (Excellent): A resin composition retention percentage of 90% or higher.

○ (Good): A resin composition retention percentage of 80% or higher and lower than 90%.

Δ (Fair): A resin composition retention percentage of 65% or higher and lower than 80%.

x (Poor): A resin composition retention percentage of lower than 65%.

(6) Variation in Processability

Five sheets of each of the obtained prepregs were stacked. A hole was drilled into the stack, and the opening was observed for the appearance and evaluated in accordance with the following criteria (number of samples: 10).

○○ (Excellent): No delamination occurred at all.

○ (Good): Nine or more samples had no delamination.

Δ (Fair): Seven or eight samples had no delamination.

x (Poor): Six or fewer samples had no delamination.

TABLE 1

| | PVA | | Acetalization step | | | Resin properties | | | | | |
|---|---|---|---|---|---|---|---|---|---|---|---|
| | Average degree of polymerization | Degree of saponification (mol %) | Aldehyde type | Aldehyde addition amount (g) | Thermoplastic resin type | $R^1$ type | Average degree of polymerization | Degree of acetalization (mol %) | Hydroxy group content (mol %) | Acetyl group content (mol %) | Tg (° C.) |
| Example 1 | 800 | 95.0 | Butyraldehyde | 160 | Polyvinyl acetal resin | $C_3H_7$ | 800 | 72.0 | 23.0 | 5.0 | 67 |
| Example 2 | 300 | 98.0 | Butyraldehyde | 150 | | $C_3H_7$ | 300 | 70.0 | 28.0 | 2.0 | 70 |
| Example 3 | 400 | 90.0 | Butyraldehyde | 145 | | $C_3H_7$ | 400 | 67.0 | 23.0 | 10.0 | 65 |
| Example 4 | 1000 | 85.0 | Butyraldehyde | 140 | | $C_3H_7$ | 1000 | 62.0 | 23.0 | 15.0 | 63 |
| Example 5 | 400 | 85.0 | Acetaldehyde | 90 | | $CH_3$ | 400 | 62.0 | 23.0 | 15.0 | 100 |
| Example 6 | 550 | 80.0 | Acetaldehyde | 45 | | $CH_3$ | 550 | 44.0 | 36.0 | 20.0 | 75 |
| | | | Butyraldehyde | 20 | | $C_3H_7$ | | | | | |
| Example 7 | 300 | 99.0 | Acetaldehyde | 35 | | $CH_3$ | 300 | 67.0 | 32.0 | 1.0 | 80 |
| | | | Butyraldehyde | 110 | | $C_3H_7$ | | | | | |
| Example 8 | 300 | 98.0 | Butyraldehyde | 150 | | $C_3H_7$ | 300 | 70.0 | 28.0 | 2.0 | 70 |
| Example 9 | 300 | 99.0 | Butyraldehyde | 135 | | $C_3H_7$ | 300 | 63.0 | 36.0 | 1.0 | 70 |
| Example 10 | 300 | 99.0 | Acetaldehyde | 90 | | $CH_3$ | 300 | 74.0 | 25.0 | 1.0 | 106 |
| Comparative Example 1 | 800 | 93.0 | Formaldehyde | 83 | Polyvinyl acetal resin | H | 800 | 86.5 | 6.5 | 7.0 | 118 |
| Comparative Example 2 | 300 | 99.0 | Acetaldehyde | 90 | | $CH_3$ | 300 | 74.0 | 25.0 | 1.0 | 106 |
| Comparative Example 3 | 300 | 99.0 | Acetaldehyde | 30 | | $CH_3$ | 300 | 67.0 | 32.0 | 1.0 | 75 |
| | | | Butyraldehyde | 110 | | $C_3H_7$ | | | | | |
| Comparative Example 4 | 300 | 99.0 | Butyraldehyde | 135 | | $C_3H_7$ | 300 | 63.0 | 36.0 | 1.0 | 70 |
| Comparative Example 5 | 300 | 99.0 | Butyraldehyde | 145 | | $C_3H_7$ | 300 | 69.0 | 30.0 | 1.0 | 68 |
| Comparative Example 6 | — | — | — | — | Polyethersulfone | — | — | — | — | — | 205 |
| Comparative Example 7 | — | — | — | — | Phenoxy resin | — | — | — | — | — | 84 |
| Comparative Example 8 | 800 | 93.0 | Formaldehyde | 83 | Polyvinyl acetal resin | H | 800 | 86.5 | 6.5 | 7.0 | 118 |
| Comparative Example 9 | 300 | 99.0 | Acetaldehyde | 90 | | $CH_3$ | 300 | 74.0 | 25.0 | 1.0 | 106 |

TABLE 2

| | Resin composition (parts by weight) | | | | | | | Evaluation (mixture) | |
|---|---|---|---|---|---|---|---|---|---|
| | Epoxy resin | | | Thermoplastic resin: Polyvinyl acetal resin | | | | Viscosity (Pa · s) | |
| | Type | Addition amount | Curing agent | Type | Addition amount | Other resins | Carbon fiber | 30° C. | 90° C. |
| Example 1 | Bisphenol A epoxy resin | 100 | 6 | Example 1 | 10 | — | 300 | 45.2 | 1.8 |
| Example 2 | | 100 | 6 | Example 2 | 10 | — | 300 | 85.4 | 0.9 |
| Example 3 | | 100 | 6 | Example 3 | 5 | — | 300 | 39.8 | 1.6 |
| Example 4 | | 100 | 6 | Example 4 | 20 | — | 300 | 46.3 | 1.4 |
| Example 5 | | 100 | 6 | Example 5 | 10 | — | 300 | 87.2 | 2.0 |
| Example 6 | | 100 | 6 | Example 6 | 5 | — | 300 | 51.1 | 1.8 |
| Example 7 | Bisphenol F epoxy resin | 100 | 6 | Example 7 | 10 | — | 300 | 40.5 | 6.7 |
| Example 8 | | 100 | 6 | Example 8 | 10 | — | 300 | 11.8 | 0.2 |

TABLE 2-continued

| | | | | | | | | | |
|---|---|---|---|---|---|---|---|---|---|
| Example 9 | | 100 | 6 | Example 9 | 10 | — | 300 | 34.3 | 0.4 |
| Example 10 | Non-aromatic epoxy resin | 100 | 6 | Example 10 | 10 | — | 300 | 12.3 | 0.4 |
| Example 11 | Bisphenol A | 100 | 6 | Example 1 | 1 | — | 300 | 3.1 | 0.3 |
| Example 12 | epoxy resin | 100 | 6 | Example 5 | 5 | — | 300 | 18.1 | 0.4 |
| Example 13 | | 100 | 6 | Example 5 | 30 | — | 300 | 5642.5 | 119.0 |
| Comparative Example 1 | Bisphenol A epoxy resin | 100 | 6 | Comparative Example 1 | 10 | — | 300 | 1229.2 | 4.7 |
| Comparative Example 2 | | 100 | 6 | Comparative Example 2 | 3 | — | 300 | 878.5 | 2.2 |
| Comparative Example 3 | | 100 | 6 | Comparative Example 3 | 10 | — | 300 | 135.0 | 1.2 |
| Comparative Example 4 | | 100 | 6 | Comparative Example 4 | 10 | — | 300 | 78.0 | 0.6 |
| Comparative Example 5 | | 100 | 6 | Comparative Example 5 | 5 | — | 300 | 129.8 | 1.1 |
| Comparative Example 6 | | 100 | 6 | — | — | 5 | 300 | 71.9 | 0.5 |
| Comparative Example 7 | | 100 | 6 | — | — | 5 | 300 | 399.8 | 1.5 |
| Comparative Example 8 | Bisphenol F epoxy resin | 100 | 6 | Comparative Example 8 | 10 | — | 300 | 666.7 | 2.5 |
| Comparative Example 9 | | 100 | 6 | Comparative Example 9 | 5 | — | 300 | 370.9 | 1.2 |
| Comparative Example 10 | | 100 | 6 | Comparative Example 9 | 45 | — | 350 | 19682.1 | 138.3 |
| Comparative Example 11 | Phenol novolac epoxy resin | 100 | 6 | Comparative Example 9 | 10 | — | 300 | 23240.0 | 6.1 |

| | Evaluation (mixture) | | Evaluation | | |
|---|---|---|---|---|---|
| | | Stability | | | |
| | Viscosity ratio (30° C./90° C.) | over time Viscosity change percentage (%) | Curing time reduction percentage (%) | Resin composition retention percentage (%) | Variation in processability |
| Example 1 | 25.1 | 132 | ○ | ○ | ○ |
| Example 2 | 94.9 | 117 | ○ | ○ | ○ |
| Example 3 | 24.9 | 109 | ○ | ○ | ○ |
| Example 4 | 33.1 | 126 | ○ | ○ | ○ |
| Example 5 | 43.6 | 113 | ○○ | ○○ | ○○ |
| Example 6 | 28.4 | 108 | ○ | ○ | ○○ |
| Example 7 | 6.0 | 133 | ○○ | ○ | ○○ |
| Example 8 | 59.0 | 138 | ○ | ○○ | ○ |
| Example 9 | 85.8 | 146 | ○ | ○ | ○ |
| Example 10 | 30.8 | 111 | ○ | ○○ | ○○ |
| Example 11 | 10.3 | 102 | ○ | ○ | ○ |
| Example 12 | 45.3 | 104 | ○ | ○ | ○ |
| Example 13 | 47.4 | 289 | ○○ | ○○ | ○○ |
| Comparative Example 1 | 261.5 | 254 | x | x | x |
| Comparative Example 2 | 399.3 | 277 | ○ | x | Δ |
| Comparative Example 3 | 112.5 | 213 | ○ | x | Δ |
| Comparative Example 4 | 125.8 | 200 | Δ | Δ | Δ |
| Comparative Example 5 | 118.0 | 181 | Δ | Δ | Δ |
| Comparative Example 6 | 143.8 | 172 | x | ○ | x |
| Comparative Example 7 | 266.5 | 241 | x | ○ | Δ |
| Comparative Example 8 | 266.7 | 268 | x | x | x |
| Comparative Example 9 | 309.1 | 250 | ○ | x | Δ |
| Comparative Example 10 | 142.3 | 462 | ○ | x | Δ |
| Comparative Example 11 | 3809.8 | 365 | x | Δ | x |

INDUSTRIAL APPLICABILITY

The present invention can provide a carbon-fiber-reinforced composite that can reduce the curing time and achieve high mechanical strength while reducing resin bleeding, and a method for producing a carbon-fiber-reinforced composite.

The invention claimed is:

1. A carbon-fiber-reinforced composite comprising:
carbon fibers;
an epoxy resin;
a curing agent; and
a thermoplastic resin,
wherein a mixture of the epoxy resin and the thermoplastic resin has a ratio of viscosity at 30° C. to viscosity at 90° C. (viscosity at 30° C./viscosity at 90° C.) of less than 100,
the thermoplastic resin is a polyvinyl acetal resin, and
the polyvinyl acetal resin has a hydroxy group content of 16.0 mol % or more and 45.0 mol % or less.

2. The carbon-fiber-reinforced composite according to claim 1,
wherein the thermoplastic resin has a glass transition temperature of 60° C. or higher.

3. The carbon-fiber-reinforced composite according to claim 1,
wherein the polyvinyl acetal resin has structural units represented by the following formula (1):

(1)

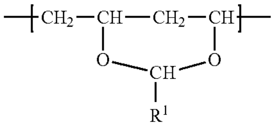

wherein each $R^1$ represents an alkyl group having a carbon number of 1 or greater, and $R^1$s may be the same as or different from each other.

4. The carbon-fiber-reinforced composite according to claim 1, which is used as a prepreg.

5. The carbon-fiber-reinforced composite according to claim 1,
wherein the epoxy resin contains a bisphenol A epoxy resin.

6. The carbon-fiber-reinforced composite according to claim 1, which contains 0.01 parts by weight or more and 40 parts by weight or less of the thermoplastic resin relative to 100 parts by weight of the epoxy resin.

7. The carbon-fiber-reinforced composite according to claim 1, which contains 0.5 parts by weight or more and 300 parts by weight or less of the epoxy resin relative to 100 parts by weight of the carbon fibers.

8. A method for producing a carbon-fiber-reinforced composite, comprising at least the steps of:
forming a resin composition containing an epoxy resin, a curing agent, and a thermoplastic resin; and
forming a composite of the resin composition with carbon fibers,
wherein a mixture of the epoxy resin and the thermoplastic resin has a ratio of viscosity at 30° C. to viscosity at 90° C. (viscosity at 30° C./viscosity at 90° C.) of less than 100,
the thermoplastic resin is a polyvinyl acetal resin, and
the polyvinyl acetal resin has a hydroxy group content of 16.0 mol % or more and 45.0 mol % or less.

* * * * *